Jan. 24, 1950 H. G. GROVE 2,495,452

COMMUNICATION SYSTEM

Filed Nov. 18, 1946

INVENTOR.

Howard G. Grove

BY

Lyon & Lyon

ATTORNEYS

Patented Jan. 24, 1950

2,495,452

UNITED STATES PATENT OFFICE 2,495,452

COMMUNICATION SYSTEM

Howard G. Grove, Los Angeles, Calif., assignor of one-half to Mobile Communication Company, Long Beach, and one-half to West Coast Electronics Company, Los Angeles, Calif., both corporations of California Application November 18, 1946, Serial No. 710,429

1 Claim. (Cl. 250—6)

Figure 1:
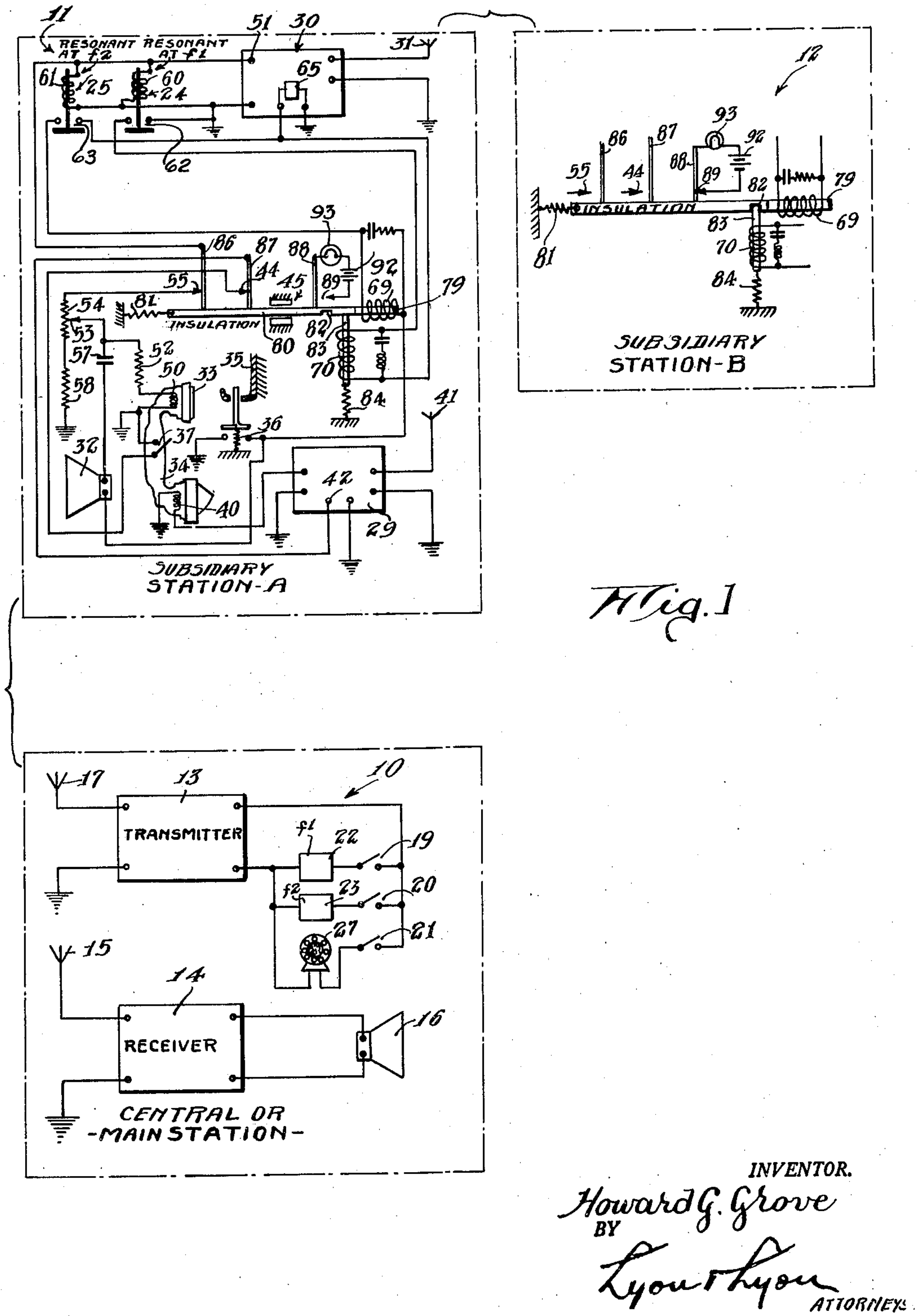

The present invention relates to communication systems and in particular to the type in which two way communication may be had between a main station and one or more of a plurality of distant stations.

In connection with the operation of taxi cabs, police cars and the like, it is desirable that information from a main station such as the dispatcher's station or police station may be sent to one or more of a plurality of taxi cabs or police cars as the case may be. It is further desirable that the driver of the cab or car may communicate with the central dispatcher.

In operation of two-way communication systems of this character, usually each and every taxi cab driver and passengers in such taxi cabs may hear the conversation between the dispatcher and the particular cab driver who is called by the dispatcher. Although such conversation may be interesting to a certain extent, by and large it is very annoying and distracting to those who are not required to participate in the conversation. This undesirable feature may be eliminated by providing selective call apparatus whereby the dispatcher may operate the apparatus to render operative only that particular radio receiver of that particular taxi cab driver with whom communication is desired. Such selective call apparatus may include a plurality of stepping relay and associated equipment not unlike that used in automatic dial telephone installations in present day use or may comprise a plurality of resonant relays which respond to tones of a definite predetermined combination to render a particular taxi cab driver's receiver operative. But, selective call apparatus of these types are expensive, cumbersome, space consuming, and require frequent servicing by specially trained personnel.

It is, therefore, an object of the present invention to provide a new and improved two-way communication system of the type specified characterized by its simplicity of operation and the simplicity of the apparatus for successfully operating the system.

Another object of the present invention is to provide, in a two-way communication system, new and improved apparatus for assuring privacy in conversations between the dispatcher and any one of a plurality of persons who the dispatcher may call.

Still, another object of the present invention is to provide, in a two way communication system, associated with operation of a fleet of taxicabs, improved apparatus whereby passengers are not subjected to annoying conversations between a dispatcher and drivers of the taxicabs either when his own driver talks to the dispatcher or his own driver listens in to conversations between the dispatcher and a driver of a different taxi cab.

The features of the present invention which are believed to be novel are set forth with particularity in the appended claim. This invention itself, both as to its organization and manner of operation, together with further objects and advantages thereof, may be best understod by reference to the following description taken in connection with the accompanying drawings in which:

Figure 1 shows a two way communication system embodying the present invention with the component parts thereof in position for private two way communication between a central or main station and subsidiary station A which is one of a plurality of subsidiary stations.

The two way communication system comprises a main station 10 and a plurality of subsidiary stations 11, 12 within signal transmitting range of central station 10.

The central station 10 may be located in a permanent building such as in a police station, taxi cab dispatcher's building or the like and correspondingly the subsidiary stations 11, 12 may comprise police cars, taxi cabs or the like.

Only two subsidiary stations; namely, subsidiary station A having the general reference numeral 11 and subsidiary station B having the general reference numeral 12, are shown in Figure 1 for the sake of convenience, it being evident that certain features of the present invention may be practiced where such subsidiary stations are unlimited in number.

The central or main station 10 has associated therewith a transmitter 13 and a receiver 14, the receiver 14 being of conventional type for receiving signals from subsidiary stations A and B on antenna 15 and reproducing the sound components thereof in speaker 16.

Transmitted 13 is arranged to transmit a carrier wave from its antenna 17 to the plurality of subsidiary stations A and B, the carrier wave being capable of modulation by three different voltages which may be selectively applied through the switches 19, 20, 21, respectively.

When switch 19 is closed, a first low frequency audible modulating voltage having a substantially constant amplitude and frequency $f_1$ is applied to the transmitter 13 from an oscillation network 22 of frequency $f_1$. Correspondingly, when switch 20 is closed, a second low frequency audible modulating voltage having a substantially constant amplitude and frequency $f_2$ is applied to the same transmitter 13 from the oscillation network 23 of frequency $f_2$, such first and second voltages being substantially equal in magnitude but different in frequency to cause selective operation of the frequency responsive devices 24, 25, respectively, at each one of stations A and B in a manner described hereinafter. Further, when switch 21 is closed, audio modulating voltages varying in accordance with variations in spoken sound of a police or taxi cab dispatcher directed on microphone 27 are applied therefrom to the transmitter 13. Thus, modulated carrier waves of three different types may be transmitted from antenna 17 to each and every subsidiary station.

Each one of the subsidiary stations include the same components which cooperate in the same way and therefore, a description of station A suffices to describe the other station B, like parts in stations A and B having the same reference numerals for easy reference.

Station A includes, besides transmitter 29, a conventional type of normally operative receiver 30 for receiving modulated carrier waves on antenna 31 and reproducing the audible components thereof in loud speaker 32 or in the receiving end 33 of a conventional telephone type of handset 34 which normally rests on its supporting member 35 to normally maintain switch 36 closed, and which is modified to incorporate a manually operable normally open switch 37 intermediate the ends thereof for convenient operation of switch 37 when the handset is manually supported.

The handset microphone winding 40 has its ungrounded terminal connected to a corresponding ungrounded terminal of transmitter 29 so that its carrier wave may be modulated by audio voice voltages and applied to its antenna 41. The transmitter, however, is not rendered operative until the serial circuit extending from its ungrounded terminal 42, through the normally closed switch 44 of the latchable frequency responsive relay having the general reference numeral 45 and the normally open switch 37 is closed.

The headset receiver winding 50 has its ungrounded terminal connected to the ungrounded audio output terminal 51 of receiver 30 through the serial circuit comprising resistance 52, adjustable tap 53, resistance 54 and the normally closed switch 55 of relay 45. Likewise, speaker 32 is supplied with audio voltage from the ungrounded receiver terminal 51 through the serial circuit extending from terminal 51, through the normally closed switch 55, through resistance 54, tap 53, condenser 57, through the voice coil of speaker 32 and through the normally open switch 36 to ground, one end of resistance 54 being grounded through resistance 58.

Frequency responsive relays 24 and 25 have actuating windings 60, 61, respectively, the ungrounded terminals of which are connected to audio output terminal 51. The relays 24 and 25 are of the so-called resonant relay type and are actuated only, as is well understood in the art, when voltages of predetermined frequency corresponding to their characteristic resonant frequencies are applied thereto. Thus, relay 24 is actuated only when voltages of frequency $f_1$ is applied to its winding 60 to close its associated switch 62; and in like manner, relay 25 is actuated only when voltages of frequency $f_2$ is applied to its winding 61 to close its associated switch 63. These frequencies $f_1$ and $f_2$ are the same as the frequencies $f_1$ and $f_2$, respectively generated at the central or main station. When the transmitter 13 is modulated with voltages of frequency $f_1$ by closing switch 19, the resulting modulated wave is received by receiver and the modulation component thereof appears as a voltage of frequency $f_1$ between terminal 51 and ground. This voltage of frequency $f_1$ causes actuation of relay 24. In similar manner, when switch 23 is closed, the transmitter is modulated with a voltage of frequency $f_2$ and a demodulated voltage wave of frequency $f_2$ appears across terminal 51 and ground to actuate relay 25. Thus, relay 24 is actuated when switch 19 is closed and relay 25 is actuated when switch 20 is closed. Switch 63 of relay 25 is connected in the series circuit extending from the ungrounded terminal of the voltage source 65 in the receiver proper, through switch 63 to one terminal of the latching winding 69 of the latchable relay 45, the other terminal of winding 69 being connected to ground through the switch 36 when the handset 34 is in its normal position on support 35. Similarly, switch 62 of relay 24 is connected in the series circuit extending from the ungrounded terminal of voltage source 65 through switch 62 to the ungrounded terminal of the unlatching winding 70 of the latchable relay 45.

The voltage source 65 may be unidirectional in character or if desired, it may comprise an amplified component of the audio voltage of the receiver in which case the windings 69 and 70 may be made resonant at the predetermined operating frequency.

Latchable relay 45 comprises a horizontally movable insulating member 80 attached to the movable magnetic core member 79 and normally biased to the left in Figure 1 by the tension spring 81 with the reentrant portion 82 thereof displaced to the left of the movable magnetic core member 83 which is normally biased upwardly into engagement with member 80 by the compression spring 84, the member 80 carrying the movable contacts 86, 87, 88 respectively, of switches 55, 44 and normally open switch 89 and being latched into position upon energization of winding 69 associated with its core 79 and then being allowed to return to unlatched position upon energization of winding 70 associated with its core 83.

When the relay 45 is in its latched position shown in station B switches 55, and 44 are opened and switch 89 is closed. Switch 89 is in a series circuit with a voltage source 92 and an indicating lamp 93 which serves to indicate the fact that the relay 45 is in latched position and that the system is in use. Then, when relay 25 is actuated by closing switch 20, the relay member 80 is moved from its position shown in station A to its corresponding latched position shown in station B to disconnect the receiver speaker and to render the associated transmitter inoperative; and, subsequently, when relay 24 is actuated by closing switch 19, the member 80 is unlatched and is allowed to return to its normal position shown at station A to reconnect the receiver and to restore the associate transmitter to operative condition.

In operation, when there is no communication between the main station and subsidiary stations, at each station the latchable relay 45 is in its normal unlatched position shown in station A; and the handset 34 is in supported position on its support 35 wherein the switch 36 is maintained in closed position thereby to close the energizing circuit for speaker 32.

In establishing privacy of communication between the main station and any one of the plurality of stations selected, the dispatcher or other person at the main station speaks into the microphone 27 with switch 21 closed calling the particular station with which he desires to establish private communication. The call of the dispatcher is heard in the speaker 32 at each station. In answering the call, the person called uses the handset 34, removing it from its support 35 to automatically cause deenergization of the associated speaker 32 while the listeners at the other station of course, allow their handsets 34 to remain on its support 35 to maintain switch 36 closed. In using the handset 34, the switch 37 is closed and the transmitter 29 is energized to cause transmission of the verbal acknowledgment spoken into the microphone end of the handset. Upon acknowledgment of the call by the person called, the dispatcher at the main station closes the switch 20 thereby to actuate relay 25 to cause the latchable relay 45 at all stations, other than the station called, to assume its latched position shown at station B, rendering inoperative the receivers and transmitter at all stations, other than the station called. This is so since the relay 45 is energized through the handset operated switch 36. Upon the completion of the resulting private two way communication with only switch 21 closed, the dispatcher at the main station closes switch 19 thereby actuating relay 24 and causing all of the relays 45 to return to normal unlatched position wherein all receivers are rendered operative again and all transmitters require only the closure of their corresponding switch 37 to make them operative again to receive subsequent calls and to acknowledge the same.

It is noted that when the relay 45 at a particular station is latched in position as shown at station B, the person may neither hear the conversation existing between the main station and the called station since the connection between the audio output terminal 51 and the speaker 32 or coil 50 is broken, nor may such person transmit since his transmitter is made inoperative by the opening of switch 44, 87. In other words, only those persons who have their handsets raised from the supporting hook 35 at the time the dispatcher closes switch 20 may join in or listen to the conversation.

I claim:

In a two way communication system in which a person at a central station calls and communicates selectively with a selected one of a plurality of persons at different subsidiary stations each of which a separate normally operative receiver is located, the steps comprising, transmitting a call from said control station to all of said subsidiary stations whereby communication may be established with said selected one, transmitting a first signal of characteristically different frequency from the frequency of said call from said central station to render all of the receivers inoperative other than the one to which communication is established, and then transmitting a second signal of characteristically different frequency from the frequency of said call and from the frequency of said first signal from said central station to render all receivers operative again after the selected communication is terminated.

HOWARD G. GROVE.

REFERENCES CITED

The following references are of record in the file of this patent:

UNITED STATES PATENTS

| Number | Name | Date |
|---|---|---|
| 1,608,969 | Webbe | Nov. 30, 1926 |
| 1,941,067 | Armstrong | Dec. 26, 1933 |
| 2,061,699 | Fox | Nov. 24, 1936 |
| 2,152,010 | Fenner | Mar. 28, 1939 |
| 2,198,901 | Boswau | Apr. 30, 1940 |
| 2,214,101 | Cumming | Sept. 10, 1940 |
| 2,250,596 | Mountjoy | July 29, 1941 |
| 2,269,143 | Champbell | Jan. 6, 1942 |
| 2,277,469 | Whitelock | Mar. 24, 1942 |
| 2,280,420 | Chappell | Apr. 21, 1942 |
| 2,280,421 | Chappell | Apr. 21, 1942 |
| 2,289,048 | Sandalls | July 7, 1942 |
| 2,334,876 | Janson | Nov. 23, 1943 |
| 2,369,783 | Homrighous | Feb. 20, 1945 |
| 2,383,908 | Bowers | Aug. 28, 1945 |
| 2,392,672 | Koch | Jan. 8, 1946 |
| 2,431,167 | Byrnes | Nov. 18, 1947 |